US 6,678,424 B1
Jan. 13, 2004

(54) REAL TIME HUMAN VISION SYSTEM BEHAVIORAL MODELING

(75) Inventor: Kevin M. Ferguson, Beaverton, OR (US)

(73) Assignee: Tektronix, Inc., Beaverton, OR (US)

( * ) Notice: Subject to any disclaimer, the term of this patent is extended or adjusted under 35 U.S.C. 154(b) by 0 days.

(21) Appl. No.: 09/438,697

(22) Filed: Nov. 11, 1999

(51) Int. Cl.$^7$ .............................. G06K 9/36; H04N 17/00
(52) U.S. Cl. ....................................... 382/286; 348/189
(58) Field of Search .............................. 382/254, 260, 382/275, 274, 239, 240, 286; 348/189, 192, 180

(56) References Cited

U.S. PATENT DOCUMENTS

| | | | | |
|---|---|---|---|---|
| 4,918,633 A | * | 4/1990 | Sullivan | 382/275 |
| 5,010,405 A | * | 4/1991 | Schreiber et al. | 348/432.1 |
| 5,313,298 A | * | 5/1994 | Meeker | 375/240.01 |
| 5,446,492 A | | 8/1995 | Wolf | 348/192 |
| 5,682,442 A | * | 10/1997 | Johnston et al. | 382/239 |
| 5,719,966 A | | 2/1998 | Brill | 382/260 |
| 5,790,717 A | | 8/1998 | Judd | 382/323 |
| 5,818,520 A | * | 10/1998 | Janko et al. | 348/192 |
| 5,974,159 A | | 10/1999 | Lubin | 382/106 |
| 6,285,797 B1 | * | 9/2001 | Lubin et al. | 382/254 |
| 6,360,022 B1 | * | 3/2002 | Lubin et al. | 382/260 |

FOREIGN PATENT DOCUMENTS

| WO | WO 9943161 | 8/1999 | H04N/7/26 |
|---|---|---|---|

* cited by examiner

*Primary Examiner*—Wenpeng Chen
(74) *Attorney, Agent, or Firm*—Francis I. Gray

(57) ABSTRACT

A method of realtime human vision system modeling to produce a measure of impairment of a test image signal derived from a reference image signal processes the two signals in respective channels. The signals are converted to luminance image signals and low-pass filtered in two dimensions. The processed image signals are then segmented and block means values are obtained which are subtracted from the pixels in the corresponding processed image signals. Noise is injected into the segmented processed image signals and a variance is calculated for the reference segmented processed image signal and also for the difference between the segmented processed image signals. The variance of difference segmented processed image signal is normalized by the variance for the reference segmented processed image signal, and the Nth root of the result is taken as the measure of visible impairment of the test image signal. The measure of visible impairment may be converted into appropriate units, such as JND, MOS, etc.

5 Claims, 1 Drawing Sheet

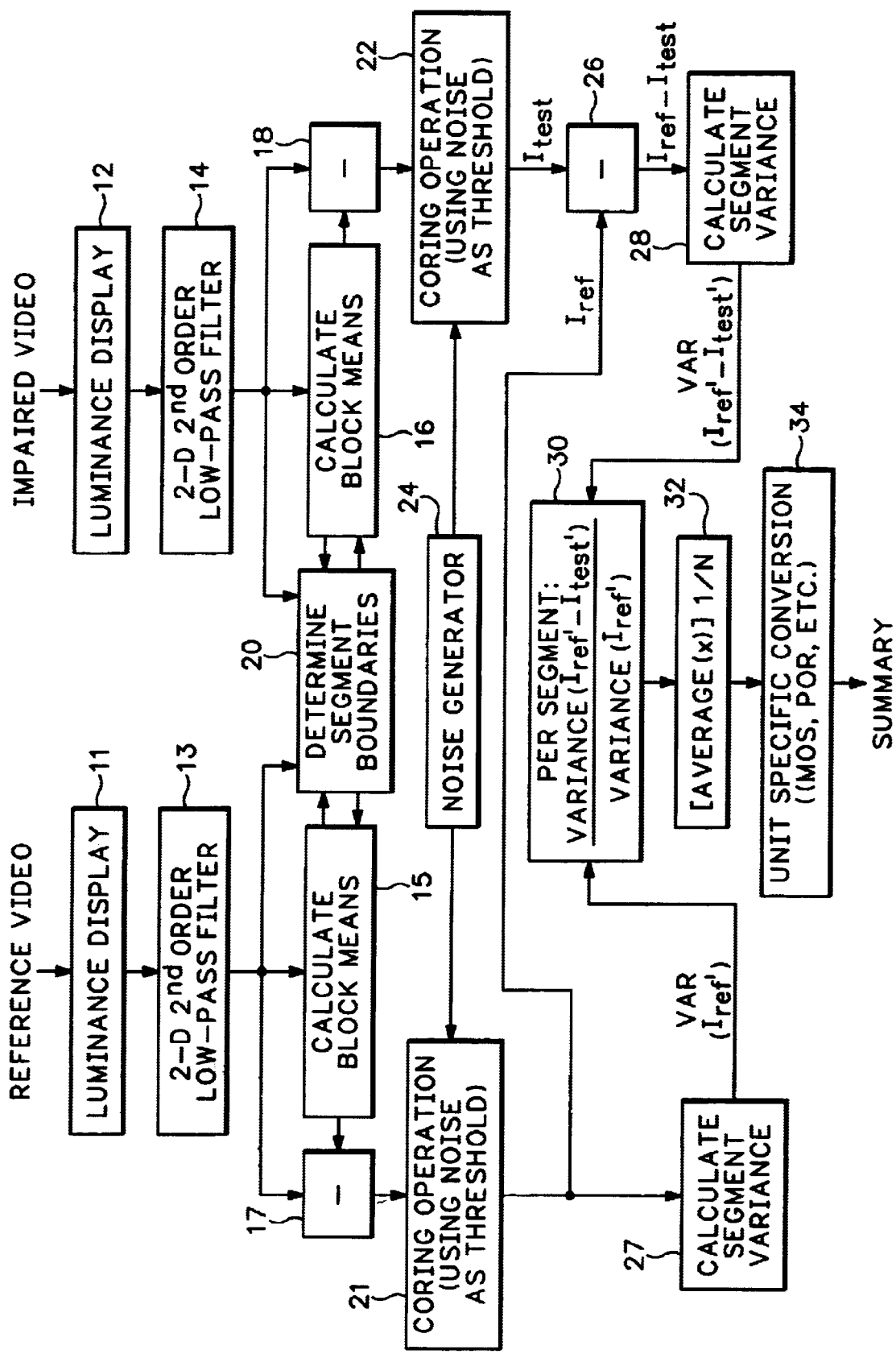

REAL TIME HUMAN VISION SYSTEM BEHAVIORAL MODELING

BACKGROUND OF THE INVENTION

The present invention relates to video picture quality assessment, and more particularly to realtime human vision system behavioral modeling for producing objective measures to predict a subjective rating of errors in a video image signal that is recorded and transmitted via methods that are lossy, such as video compression.

Existing methods for using human vision system models for predicting observer subjective reactions to errors introduced into a video image signal subjected to lossy processes, such as video compression, include computationally expensive human vision system (HVS) models, such as those described by J. Lubin, "A Visual Discrimination Model for Imaging System Design and Evaluation", Vision Models for Target Detection and Recognition, World Scientific Publishing, River Edge, N.J. 1995, pp. 245–283, or by S. Daly "The Visible Differences Predictor: An Algorithm for the Assessment of Image Fidelity", Digital Images and Human Vision, MIT Press, Cambridge, Mass. 1993, pp. 162–206. Measures used to predict subjective impairment ratings that do not use human vision models include ANSI/IRT measurements (see "Digital Transport of One-Way Signals-Parameters for Objective Performance Assistance", ANSI T1.801.03-yyy) that are generally faster but, given a sufficiently varied set of video image content, do not correlate as well with subjective ratings as do the methods that include HVS models.

Most HVS models are based on methods of predicting the threshold of noticeable differences, commonly referred to as Just Noticeable Differences (JND), such as contrast detection and discrimination thresholds. Since the model components are based on mimicking behavior at threshold, behavior above threshold, i.e., at suprathreshold, is not guaranteed. These HVS models generally include one or more stages to account for one or more of the experimentally determined behaviors near incremental contrast detection and discrimination threshold as effected by the following parameters:

- mean luminance
- angular extent or size of target image on retina
- orientation (rotational, both of target image pattern and masker)
- spatial frequency (both of target image pattern and masker)
- temporal frequency (both of target image pattern and masker)
- surround (or lateral masking effects)
- eccentricity (or angular distance from the center of vision/fovea)

What follows is a brief summary of how one or more of the effects of these seven parameters have been accounted for in HVS models.

First it is worth noting the approach to the image processing flow structure in prior art. A large portion of the processing time required in HVS models is due to two common implementation stages:

- filter bank (image decomposition such as Gaussian pyramids)
- contrast gain control (contrast masking non-linearity)

Filter banks are popular for image decomposition into neural images or channels with maximum response at various orientations, spatial frequency bands, polarities, etc. For a practical implementation a minimal decomposition of two orientations (horizontal, vertical), four spatial frequency bands and two polarities requires 2*4*2=16 images per processing stage for the reference image signal, and likewise for the impaired video image signal.

For the typical HVS model response sensitivity as a function of spatial frequency has been accounted for in what has been called the contrast sensitivity function. The contrast sensitivity portion of the model has been accomplished by:

Calculating the contrast at each pixel of each filter bank channel, corresponding to a unique combination of spatial frequency subband and rotational orientations, as the ratio of high frequency energy to low (DC) frequency energy, or the equivalent.

Scaling the contrast values depending on the sub-band and rotational orientations.

Calculating contrast requires two different filters, high pass and low pass, and a division for each pixel of each channel. Even with this complex and expensive algorithm stage, variation in spatial frequency sensitivity function of local average luminance and angular extent of segment or self-similar regions of the image is not taken into account. The "linear range" is not exhibited in these models. At frequencies where sensitivity is generally the greatest, between one and four cycles per degree, the contrast sensitivity increases roughly proportional to the square root of the average luminance and likewise for angular extent. Thus, while the prior art includes quite complex and computationally expensive methods, by ignoring the effects of average luminance and angular extent threshold predictions may be in error by greater than an order of magnitude. Though models for part of the HVS have been proposed to account for the effects of average luminance and angular extent, they apparently have not been adopted into subsequent full HVS models, ostensibly due to the further added complexity.

The contrast gain control portion of the model is generally based on the work of J. Foley, such as his "Human Luminance Pattern-Vision Mechanisms: Masking Experiments Require a New Model", Journal of the Optical Society of America, Vol. 11, No. 6 June 1994, pp. 1710–1719, that requires a minimum of Calculation of the sum of energy (square) of respective pixels of the scaled contrast images over all channels. Lower resolution channels are up-sampled in order to be summed with higher resolution channels. This channel to channel conversion increases the effective throughput at this stage and further complicates implementation.

One addition, two non-integer exponentiations and one division operation per pixel per channel. M. Cannon, "A Multiple Spatial Filter Model for Suprathreshold Contrast Perception", Vision Models for Target Detection and Recognition, World Scientific Publishing, River Edge, N.J. 1995, pp. 88–117, proposed a model that extends to the suprathreshold region with a substantial increase in complexity. However it too apparently has not been adopted into subsequent full HVS models, ostensibly due to the further added complexity.

Temporal effects on spatial frequency sensitivity in these models mostly either have been absent, have tended to only include inhibitory effects, or have been relatively complex.

Finally the effects of orientation and surround are only represented to the extent that the orthogonal filters and cross-pyramid level maskings are capable, generally not well matched with HVS experimental data.

A current picture quality analyzer, the PQA-200 Analyzer manufactured by Tektronix, Inc. of Beaverton, Oreg., USA, is described in U.S. Pat. No. 5,818,520. This is a nonrealtime system based on the JNDMetrix® algorithm of Sarnoff Corporation of Princeton, N.J., USA where a reference image signal is compared with a corresponding impaired video image signal to obtain differences which are processed according to an HVS model. In order to perform the assessment, the system under test is essentially taken out of service until the test is complete.

What is desired is a realtime HSV behavioral modeling system for video picture quality assessment that is simple enough to be performed in a realtime video environment.

BRIEF SUMMARY OF THE INVENTION

Accordingly the present invention provides realtime human vision system behavioral modeling for performing picture quality analysis of video systems in a realtime video environment. A reference image signal and a test image signal derived from the reference image signal are processed in separate channels. The image signals are converted to luminance image signals and filtered by a two-dimensional low-pass filter to produce processed image signals. The processed image signals are segmented into regions having similar statistics, and the segment or region means are subtracted from the pixels of the processed image signals to produce segmented processed image signals that have been implicitly high pass filtered. Noise is injected into the segmented processed image signals, and variances are calculated for the reference segmented processed image signals and for the differences between the reference and test segmented processed image signals. The variance for the difference segmented processed image signal is normalized by the variance for the reference segmented processed image signal, and the Nth root of the result is determined as a measure of visible impairment of the test image signal. The measure of visible impairment may be converted into appropriate units, such as JND, MOS, etc.

The objects, advantages and other novel features of the present invention are apparent from the following detailed description when read in conjunction with the appended claims and attached drawing.

BRIEF DESCRIPTION OF THE SEVERAL VIEWS OF THE DRAWING

The FIGURE is a block diagram view of a system for video picture quality assessment using realtime human vision system behavioral modeling according to the present invention.

DETAILED DESCRIPTION OF THE INVENTION

In examining the behavior of the human vision system revealed by data from the literature in combination with evidence of the influence of various noise sources in the human vision system, the following observations may be made:
1. Amplitude sensitivity at the upper spatial frequency range, the linear region of luminance influence on contrast sensitivity function, is insensitive to changing average luminance, yet falls off as the square of the frequency. This corresponds to a second order low-pass filter.
2. The Weber and Devries-Rose regions (see Taylor et al, "Contrast Detection and Discrimination for Visual Models" and N. Graham, "Visual Pattern Analyzers", Oxford U. Press 1989) both correspond to the lower frequency range where amplitude sensitivity is most influenced by changing average luminance. Examination of amplitude versus frequency curves at various average luminance reveals the behavior similar to a variable high-pass filter dependent on the average luminance. A model based on a similar observation was proposed by Cornsweet and Yellott, "Intensity-Dependent Spatial Summation", Journal of the Optical Society of America, Vol. 22, No. 10 1985, pp. 1769–1786. Rohaly and Buchsbaum, "Global Spatiochromatic Mechanism Accounting for Luminance Variations in Contrast Sensitivity Functions", Journal of the Optical Society of America, Vol. 6, Feb. 1989, pp. 312–317, proposed a model based on contrast, as opposed to amplitude, using a fixed high pass filter and variable low pass filter. In all cases a band pass is formed by combining, or cascading, a low pass filter with a high pass filter, with one filter fixed and the other a function of average luminance. Since contrast calculation requires additional steps, amplitude representation, which implies a fixed low pass filter and a variable high pass filter, is more efficient.
3. The pedestal effect in contrast discrimination between near threshold intensities is consistent with the evidence of spatially stationary (fixed) noise—errors dependent on foveal location, but independent of time—and other noise in the human vision system.

Below the noise floor contrast increment for detection decreases with increasing pedestal threshold, while above the noise floor it increases with increasing pedestal threshold. Others have proposed non-fixed noise, but apparently these have yet to be incorporated in a full HVS model used for predicting visible impairment of a video image signal.
4. The square root law relationship between angular extent and both contrast and discrimination thresholds implies each image should be segmented into regions of similar statistics, thereby dividing the full image area into smaller sets of somewhat "coherent" areas. The larger the area, the lower the effective contrast sensitivity high pass cut-off frequency is when the mean is subtracted.
5. Contrast discrimination increment elevation due to lowered average luminance, dissimilar masking signals and reduced patch area implies a process similar to optimal signal detection using matched filters. In such a system differences may be measured by subtracting correlation coefficients between processed reference and test images from unity.
6. Though subtracting the correlation coefficients from unity predicts threshold and discrimination well, it does not predict perceived suprathreshold differences well. Well above threshold perceived contrast increases with approximately the square root of the actual contrast. In order to match behavior at threshold and suprathreshold simultaneously with one simple mathematical expression, the Nth root of the normalized variance of processed image differences is used, which in this example is the fourth root:

$$\text{Response} = K^*(\text{var}(\text{Itest\_proc} - \text{Iref\_proc})/\text{var}(\text{Iref\_proc}))^{0.25}$$ where Iref_proc and Itest_proc are the processed, filtered and noisy, reference and test images respectively and var( ) is variance.

(a) At threshold the desired behavior is approximately:

$$\text{Response} = K^*(\text{sum}(\text{Itest\_proc}^2 + \text{Iref\_proc}^2 - 2^*\text{Itest\_proc}^*\text{Iref\_proc})^{0.25})/\text{var}(\text{Iref\_proc})^{0.25}$$

$$\text{Response} \approx K^*(2 - 2^*\text{correlation}(\text{Iref\_proc}, \text{Itest\_proc}))^{0.25} = 1$$

(b) Above threshold the desired behavior is approximately:

$$\text{Response} = K^*(\text{sum}(|\text{Itest\_proc} - \text{Iref\_proc}|^2)/\text{var}(\text{Iref\_proc}))^{0.25}$$

and for a flat field image reference, Iref_proc=noise

Response=$K*(\text{sum}(|\text{Itest\_proc}|^2)/\text{var}(\text{noise}))^{0.25}$ Here the suprathreshold response to contrast, relative to zero contrast, increases as the square root of the contrast. Thus both the threshold and suprathreshold conditions are met. Conveniently the Nth root need not be taken until the entire image has been pooled over segment measurements, which is equivalent to taking the q-norm with q=4 for this example.

Corresponding model components and six calibration parameters are:

(a) Two dimensional infinite impulse response second-order low-pass filter calibration parameters include (i) input scale, which could be placed in the display model for convenience, and (ii) feedback coefficient, which sets a double pole. This may be implemented in an equivalent finite impulse response filter, as is well known to those in the art.

(b) Segmentation (region growing) is guided by (i) threshold for segment block mean totals and (ii) threshold for approximate segment variance of block variance. Recalculate block means as mean of luminance in segment, using segment's block means, and subtract local mean (means luminance of the corresponding segment) from each pixel.

(c) Noise generator and "obscurer" (greatest value operator) calibration involves selection of noise amplitude. For each segment the normalized difference variance (variance of processed reference minus impaired, var(Iref_proc−Itest_proc), divided by variance of the processed reference image, var(Iref_proc)) is calculated. No calibration constants are required for this step.

(d) For the entire image the aggregate measure is calculated as the Nth root of the average of the segment normalized difference variances, where for this example N=4. This aggregate measure is converted to appropriate units with a conversion or scaling factor (K above for threshold or JND units).

Referring now to the Figure a flow chart for a picture quality assessment apparatus is shown that improves on the prior art by combining the bulk of the accuracy of the HVS models with the efficiency comparable to non-HVS models. A reference video signal and an impaired (test) video signal are input to respective display models 11, 12 for conversion into luminance units. The spatial frequency response, corresponding to contrast sensitivity threshold data, is implemented as respective two-dimensional low-pass filters 13, 14 and one implicit high pass filter (local mean (low pass) from step 15, 16 is subtracted in step 17, 18 respectively from each individual pixel). This filter combination satisfies the requirements suggested by the data (Contrast Sensitivity versus Frequency) in the literature for each orientation, average luminance and segment area. There is only one image output from this stage to be processed by subsequent stages for each image, as opposed to a multiplicity of images output from filter banks in the prior art. A nonlinear temporal filter could be inserted next to account for a great deal of the temporal behavior of the HVS model, but is not shown in this implementation.

Block means are calculated 15, 16, such as for three pixels by three pixels blocks. In both channels the image is segmented 20 based on block average mean and other simple block statistics. However for simplification and reduction of computation resources the step 20 may be omitted. Block statistics used in the current segmentation algorithm include local (block) means luminance and previous variance. However simple max and min values may be used for region growing. Each block means is averaged over the segment to which it belongs to create new block means. These means are subtracted 17, 18 from each pixel in the respective blocks completing the implicit high pass filter.

Noise from a noise generator 24 is injected at each pixel via a coring operation 21, 22 by choosing the greater between the absolute value of the filtered input image and the absolute value of a spatially fixed pattern of noise, where:

Core$(A,B)=\{(|A|-|B|)$ for $|A|>|B|$; 0 for $|A|<|B|\}$ where A is the signal and B is the noise. Segment variance is calculated 27, 28 for the reference image segments and the difference 26 between the reference and test image segments. The two channel segment variance data sets are combined 30 by for each segment normalizing (dividing) the test (difference) channel variance by the reference variance.

Finally the Nth root of the average of each segment's normalized variance is calculated 32 to form an aggregate measure. Again for this example N=4, where N may be any integer value. The aggregate measure may be scaled or otherwise converted 34 to appropriate units, such as JND, MOS, etc.

Thus the present invention provides realtime human vision system behavioral modeling for determining impairment of a test video image signal from a reference video image signal by processing the two signals in parallel channels, obtaining an averaged segment variance for the reference image and for a differenced (reference—test) image, normalizing the average segment variances, taking the Nth root to form an aggregate measure, and then converting the result to appropriate units.

What is claimed is:

1. A method of realtime human vision system behavioral modeling to obtain a measure of visible impairment of a test image signal derived from a reference image signal comprising the steps of:

filtering each image signal to produce respective processed image signals;

injecting a noise signal into each of the processed image signals;

calculating variances for the processed image signal representing the reference image signal and for a difference processed image signal representing the difference between the processed image signals from the injecting step; and combining the variances to obtain the measure of impairment.

2. The method as recited in claim 1 wherein the combining step comprises the steps of:

normalizing the variance of the difference processed image signal using the variance of the reference processed image signal to produce a normalized variance for the difference processed image signal; and taking the Nth root of the normalized variance as the measure of impairment.

3. The method as recited in claim 1 further comprising the step of converting the measure of impairment into appropriate units.

4. The method as recited in claim 1 wherein the filtering step comprises the steps of:

converting the reference and test image signals into respective luminance image signals;

performing a two-dimensional low-pass filter operation on the respective luminance image signals to produce the respective processed image signals.

5. The method as recited in claim 4 wherein the filtering step further comprises the steps of:

segmenting the respective processed image signals from the performing step into regions of similar statistics to produce segmented processed image signals;

obtaining block means for each of the segmented processed image signals; and subtracting the respective block means from each pixel of the respective processed image signals to produce filtered image signals as the processed image signals for input to the injecting step.

* * * * *